A. J. TINGLEY, S. ROOSA & G. GOULD.
BEAN GATHERING MACHINE.
APPLICATION FILED JAN. 25, 1913.
1,114,416.
Patented Oct. 20, 1914.
2 SHEETS—SHEET 1.
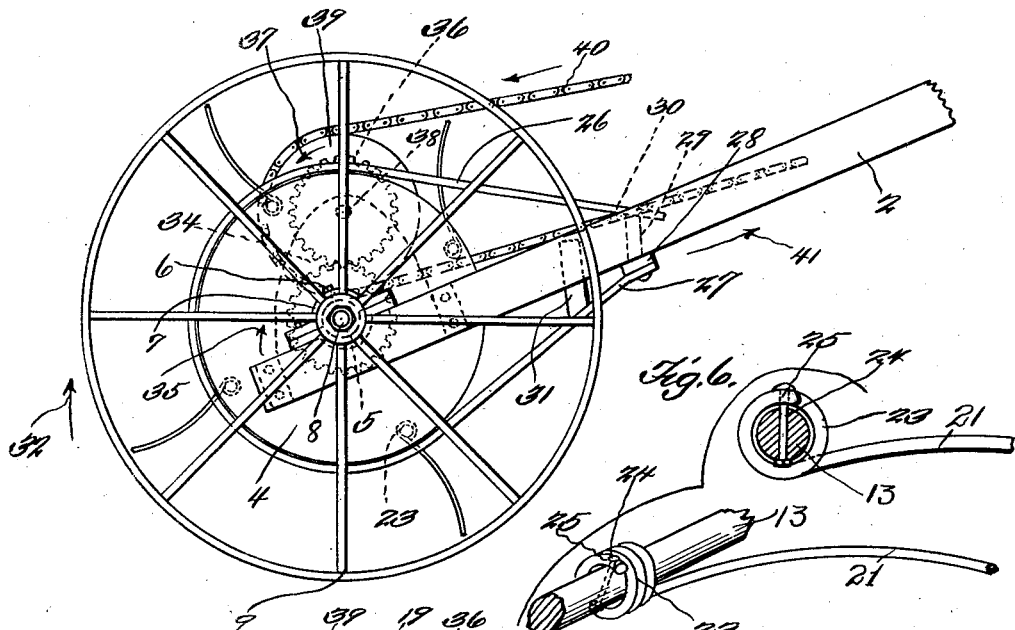
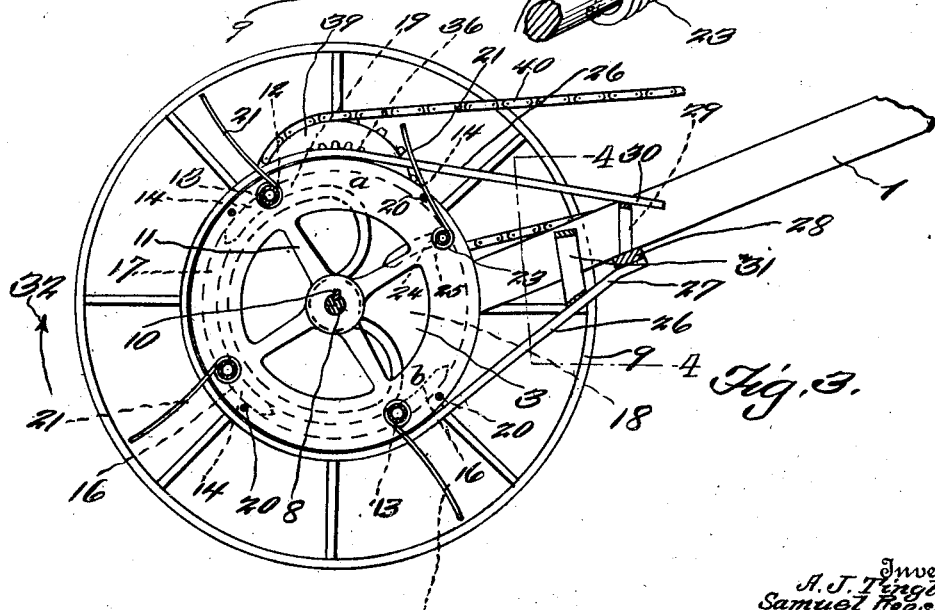

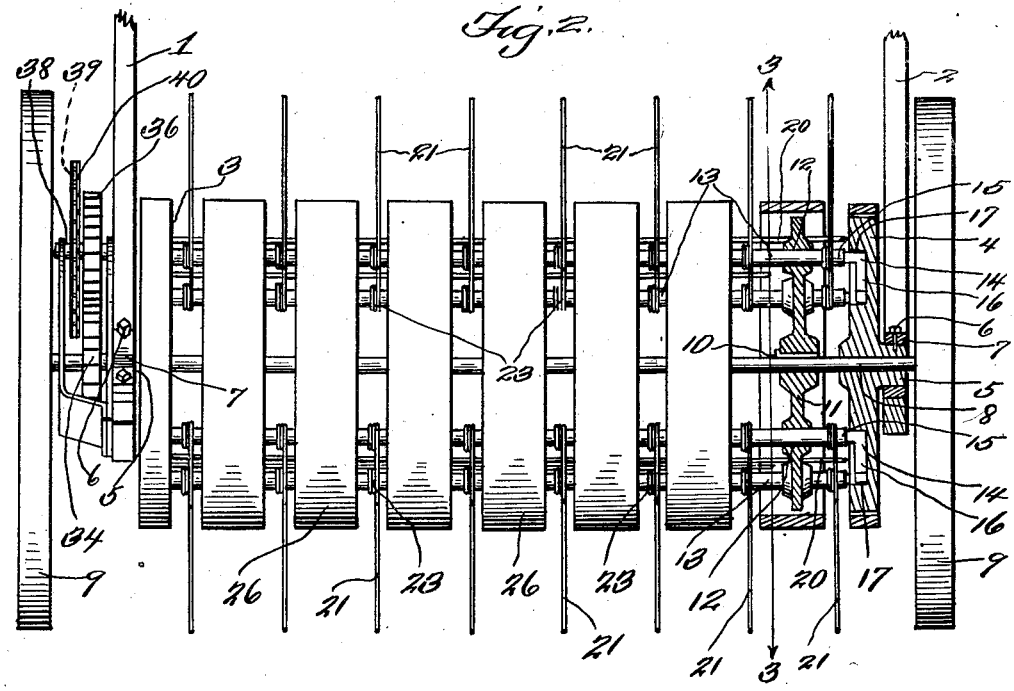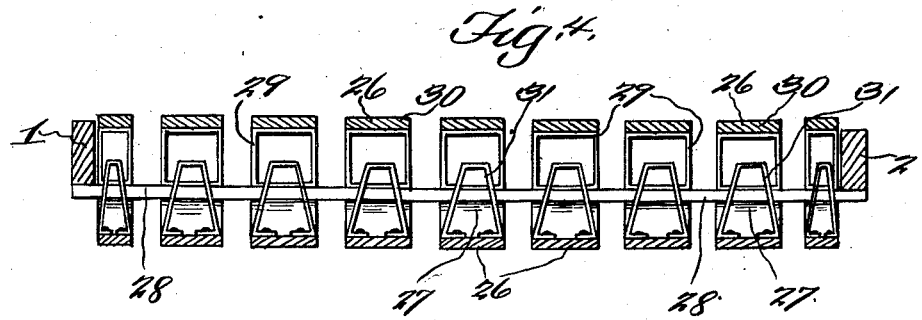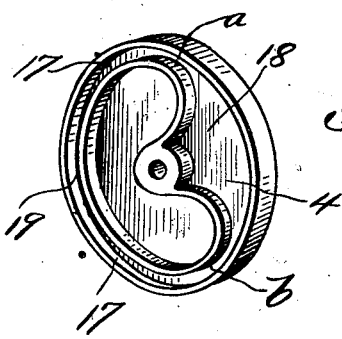

UNITED STATES PATENT OFFICE.

ALLEN J. TINGLEY, SAMUEL ROOSA, AND GLENN GOULD, OF OWOSSO, MICHIGAN.

BEAN-GATHERING MACHINE.

1,114,416.   Specification of Letters Patent.   Patented Oct. 20, 1914.

Application filed January 25, 1913. Serial No. 744,135.

*To all whom it may concern:*

Be it known that we, ALLEN J. TINGLEY, SAMUEL ROOSA, and GLENN GOULD, citizens of the United States, residing at Owosso, in the county of Shiawassee and State of Michigan, have invented a new and useful Bean-Gathering Machine; and we do hereby declare the following to be a full, clear, and exact description of the invention, such as will enable others skilled in the art to which it appertains to make and use the same.

This invention relates to a new and useful bean gathering machine.

As an object of the invention it is the aim to provide a machine of this nature comprising a skeleton cylinder having a series of forks adapted to be automatically thrown into position for gathering the beans and the vines thereof, and holding such forks in position for a short distance of their annular travel, in order to elevate the vines and the beans thereon, so as to be deposited upon a conveyer (not shown).

Another object of the invention is the provision of a series of guards or stripper plates surrounding the skeleton cylinder and arranged between the forks, to strip the vines from the fork, as well as acting as guides for the same.

There are disclosed in the drawings certain features of construction, but in practical fields these features may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a side elevation of apparatus embodying the invention. Fig. 2 is an end elevation of the same, parts in section, Fig. 3 is a longitudinal section taken on line 3—3 of Fig. 2, Fig. 4 is a detail section on line 4—4 of Fig. 3, parts being omitted, Fig. 5 is a perspective view of a disk included in the apparatus. Fig. 6 is a detail view, showing how each of the forks is secured to its respective rod.

Referring more particularly to the drawings 1 and 2 designate side bars forming a portion of the frame of the machine, while 3 and 4 denote disk plates having extension hubs 5, which are fixed as at 6 in the bearings 7 of the bars 1 and 2. These disk plates are non-rotatable, owing to the fact that they are fixed as at 6. Revolubly mounted in the disk plates 3 and 4 is a shaft 8, upon the ends of which are wheels 9, in order to impart motion to the shaft. These wheels 9 engage the ground, as will be noted. Keyed or otherwise fixed, as shown at 10, near the ends of said shaft are wheels 11, having bearings 12, receiving a plurality of rocker rods 13 as shown. Cranks 14 are rigidly secured at 15 to the ends of the rocker rods 13 and are disposed to travel within the cam grooves 17 of the disk plates 3 and 4. The cam grooves 17 are provided with enlarged openings or spaces 18, as shown. The spaces 18 receive the crank when they leave the portions 19 of the grooves, whereby the cranks are released. Connecting the wheels 11 are stop rods 20, for supporting forks 21, carried by the rocker rods 13, when the cranks 14 enter the spaces 18. The forks 21 are suitably resilient and are provided with coils 23, which fit upon the rocker rods 13. Bolts 24 extend through the rocker rods, to secure the ends 25 of the coils to said rocker rods 13, as shown. The coils 23 fit the rods 13 loosely, having greater diameters than the rocker rods, whereby when the forks engage the vines they will yield, the coils winding up. Arranged between said forks are a series of stripper plates or guards 26, the greater portions of such plates are concentric with the skeleton cylinder, which is constructed of the said rods 13 and disk plates 3 and 4. The ends 27 of the stripper plates are secured to the tie bar 28, upon which the arch irons 29 are secured. The ends 30 of the stripper plates are secured to the arch irons. These stripper plates not only act to strip the vines from the forks, but also constitute guides for said forks. Secured upon the end portions 27 of the stripper plates are inverted V-shaped members 31, between which the forks pass, in order to guide the same.

In the operation of this improved machine the wheels 9 necessarily rotate in the direction of the arrow 32, in order that the forks will gather the vines and the beans thereon in the direction of said arrow 32. The forks 21 traveling upwardly carry the material upwardly upon the exterior of the stripping plates 26, and finally discharge the same upon the upper horizontal portion thereof. During this operation the cranks 14 have been traveling in groove 17, but now pass from the forward end thereof, whereby cranks 14 will swing the forks 21 back, allowing them to be withdrawn from the material upon the stripping-plates 26. When the cranks 14 engage the lower portion $b$, they are thrown forwardly, so that forks 21 are again radially disposed. Owing to the wheels 9 rotating in this manner, the gear 34 will rotate in the direction of the arrow 35, which in turn will rotate the gear 36 in the direction of the arrow 37. The gear 36 is mounted upon and rotatable with the stub shaft 38, on which the sprocket wheel 39 is rotatable therewith. A sprocket chain 40 travels about the sprocket 39, and is adapted in turn to rotate a conveyer (not shown) in the direction of the arrow 41, in order to elevate the vines and the beans thereon to a side carrier or chute.

From the foregoing it will be noted that there has been devised a simple and efficient bean gathering machine, and one which has been found desirable and practicable.

The invention having been set forth, what is claimed as new and useful is:—

The combination with a frame provided with bearings, of apertured disk-plates having hubs extending into the bearings and locked therein and provided upon their inner faces with cam grooves, a shaft rotatably mounted within the apertures of the disk-plates, traction wheels secured to the ends of the shaft to rotate the same, wheels arranged adjacent to the disk-plates and rigidly secured to the shaft and having openings near their peripheries, rocker-rods loosely mounted within the openings of the second named wheels and provided at their ends with cranks which operate within the cam grooves, forks secured to the rocker-rods, stop-rods secured to second named wheels and adapted to support the forks, and stripping plates surrounding the second named wheels and receiving the forks therebetween.

In testimony whereof we have signed our names to this specification in the presence of two subscribing witnesses.

ALLEN J. TINGLEY. [L. S.]
SAMUEL ROOSA. [L. S.]
GLENN GOULD. [L. S.]

Witnesses:
G. DEAN SHOULTERS,
WILLIAM T. EAGAN.